(12) United States Patent
Lee et al.

(10) Patent No.: US 8,184,616 B2
(45) Date of Patent: May 22, 2012

(54) CHANGING CODEC INFORMATION TO PROVIDE VOICE OVER INTERNET PROTOCOL (VOIP) TERMINAL WITH COLORING SERVICE

(75) Inventors: Ho-Yul Lee, Suwon-si (KR); Dae-Hyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1282 days.

(21) Appl. No.: 11/269,806

(22) Filed: Nov. 9, 2005

(65) Prior Publication Data

US 2006/0120356 A1 Jun. 8, 2006

(30) Foreign Application Priority Data

Dec. 2, 2004 (KR) .................. 10-2004-0100676

(51) Int. Cl.
*H04L 12/66* (2006.01)

(52) U.S. Cl. ........ 370/352; 370/521; 370/356; 704/503; 704/500; 704/504; 375/521; 709/247

(58) Field of Classification Search .................. 370/351, 370/401, 352–356, 521; 704/500, 503, 504; 375/240.25; 709/247
See application file for complete search history.

(56) References Cited

U.S. PATENT DOCUMENTS

| | | | |
|---|---|---|---|
| 6,356,545 B1 | 3/2002 | Vargo et al. | |
| 6,377,573 B1* | 4/2002 | Shaffer et al. | 370/356 |
| 7,298,833 B2* | 11/2007 | Klein et al. | 379/201.02 |
| 2004/0057381 A1 | 3/2004 | Tseng et al. | |
| 2004/0114575 A1* | 6/2004 | Morita et al. | 370/352 |
| 2004/0120494 A1* | 6/2004 | Jiang et al. | 379/210.01 |
| 2004/0258016 A1* | 12/2004 | Schmidt et al. | 370/329 |
| 2005/0096006 A1* | 5/2005 | Chen et al. | 455/400 |
| 2005/0190746 A1* | 9/2005 | Xiong et al. | 370/352 |
| 2005/0243989 A1* | 11/2005 | Lee et al. | 379/207.16 |
| 2006/0094472 A1* | 5/2006 | Othmer et al. | 455/563 |
| 2006/0109970 A1* | 5/2006 | Shim et al. | 379/207.16 |

(Continued)

FOREIGN PATENT DOCUMENTS

EP 1 107 538 A3 6/2001

(Continued)

OTHER PUBLICATIONS

Widerthan Newsletter, "WiderThan.com & HP . . . A Perfect Match for the COLORing Solution", Apr. 19, 2004, downloaded from: www.widerthan.com/global/newsroom/letter_view.html, Mar. 21, 2006.

(Continued)

*Primary Examiner* — Joe Cheng
*Assistant Examiner* — Khaled Kassim
(74) *Attorney, Agent, or Firm* — H.C. Park & Associates, PLC (57) ABSTRACT

A system and method to change codec information to provide a coloring service in a Voice over Internet Protocol (VoIP) terminal uses different compression methods depending on a calling state and a call connecting state between the VoIP terminals so that a more efficient coloring service is provided. The system for changing codec information includes a gateway adapted to compress ring back tone data in a calling state and to compress voice signal data in a call connecting state between communication terminals according to preset different compression information and to transmit both data to a receiving terminal.

18 Claims, 7 Drawing Sheets

U.S. PATENT DOCUMENTS

| | | | | |
|---|---|---|---|---|
| 2007/0286372 A1* | 12/2007 | DeMent et al. | ........... | 379/142.01 |
| 2008/0031440 A1* | 2/2008 | Kong | ................. | 379/221.09 |
| 2008/0192912 A1* | 8/2008 | Miao | ................. | 379/201.12 |
| 2009/0180605 A1* | 7/2009 | Liu et al. | ................. | 379/221.09 |

FOREIGN PATENT DOCUMENTS

| | | |
|---|---|---|
| GB | 2 374 248 A | 10/2002 |
| WO | WO 2005/057962 A1 | 6/2005 |

OTHER PUBLICATIONS

*Combined Search and Examination Report under Sections 17 and 18(3)* from the Great Britain Patent Office issued in Applicant's corresponding Great Britain Patent Application No. 0523511.4 dated Mar. 27, 2006.

\* cited by examiner

CHANGING CODEC INFORMATION TO PROVIDE VOICE OVER INTERNET PROTOCOL (VOIP) TERMINAL WITH COLORING SERVICE

CLAIM OF PRIORITY

This application makes reference to, incorporates the same herein, and claims all benefits accruing under 35 U.S.C. §119 from an application for SYSTEM AND METHOD FOR CHANGING CODEC INFORMATION TO PROVIDE VoIP TERMINAL WITH COLORING SERVICE earlier filed in the Korean Intellectual Property Office on 2 Dec. 2004, and there duly assigned Serial No. 2004-100676.

BACKGROUND OF THE INVENTION

1. Field of the Invention

The present invention relates to a system and method for changing codec information to provide a VoIP terminal with a coloring service, and more specifically to a system and method for changing codec information to provide a VoIP terminal with a coloring service, the VoIP terminal providing a more efficient coloring service by applying different compression schemes depending on a calling state and a call connecting state between VoIP terminals.

2. Description of the Related Art

Voice over Internet Protocol (VoIP) is a transmission scheme to transmit voice information using an IP. That is, VoIP does not use a traditional protocol based on a line like an existing Public Switched Telephone Network (PSTN), but rather transmits voice information in digital form within discrete packets. By implementing an integrated telephone service utilizing the existing IP network as is with VoIP and Internet telephone technologies, telephone users can use toll and international telephone services in Internet and Intranet environments with only a local telephone charge.

The most basic function to make a synergy effect by combining voice and data in VoIP technology is a voice service function using an IP. Particularly, representative codec schemes to compress voice transferred between terminals upon voice communication using VoIP are G.711, G.729, G.723.1 and G.726. However, the algorithmic Mean Option Score (MOS) deterioration as shown in Table 1 below occurs depending on a type of coding scheme with which the voice is transmitted.

TABLE 1

| Compression scheme | Bit rate (kbps) | Processing (mips) | Frame size (unit) | MOS score |
|---|---|---|---|---|
| G.711 PCM | 64 | 0.34 | 0.125 | 4.1 |
| G.726 PCM | 32 | 14 | 0.125 | 3.85 |
| G.728 LD-CELP | 16 | 33 | 0.625 | 3.61 |
| G.729 CS-ACELP | 8 | 20 | 10 | 3.92 |
| G.729 × 2 Encoding | 8 | 20 | 10 | 3.27 |
| G.729 × 3 Encoding | 8 | 20 | 10 | 2.68 |
| G.729a CS-ACELP | 8 | 10.5 | 10 | 3.7 |
| G.723.1 MP-MLQ | 6.3 | 16 | 30 | 3.9 |
| G.723.1 ACELP | 5.3 | 16 | 30 | 3.65 |

That is, a voice quality deterioration phenomenon occurs due to a characteristic of a codec technology used in VoIP as shown in Table 1. Accordingly, in order to provide a voice quality service on VoIP which is similar to that of PSTN, the G.711 PCM scheme should be utilized, where algorithmic MOS deterioration is the minimum. However, since the G.711 PCM scheme wastes more bandwidth compared with other codec schemes, the MOS of Table 1 should not be solely considered in diagram of the bandwidth of a network. Particularly, although the G.723.1 MP-MLQ scheme and G.729 CS-ACELP scheme have MOS values of 3.9 and 3.92 that are lower than that of G.711 PCM scheme, they have better MOS performance than that of the G.711 PCM scheme in contrast with the bandwidth since the MOS deterioration is hard to perceive compared with the G.711 PCM scheme. Therefore, a codec technology that is generally used in a current VoIP gateway is the G.729 CS-ACELP scheme that has an excellent MOS value compared to the bandwidth.

Communication networks, in which the call charge is a main income source, have recently tried to increase profits by adding various additional services, and accordingly, service provisions using a tone generator have increased. A representative service includes a coloring service such as a Coloring and a Ring To Me, which is provided before a speech path has been established. This is a CS-ACELP scheme based on a narrowband voice conversion and voice property, which causes consumer dissatisfaction with the speech quality unlike the voice service, such that the user has a bad impression of VoIP service. In order to overcome this problem, VoIP service can be provided by utilizing the G.711 PCM scheme which has a high MOS. However, it cannot be a desirable solution in that it causes a problem in using network resources efficiently and can create a limited inconvenience for a data service due to performance of a bandwidth resource reservation function for guaranteeing the speech quality of VoIP.

In a call setup process using H.323 protocol in a VoIP system, a sending Media Gateway (MG) transmits "Q.931 Set up" message to a receiving MG. That is, the sending MG transmits a list of several codec information to the receiving MG so as to negotiate with the receiving MG. Accordingly, the receiving MG transmits a confirmation message of "Q.931 Call Proceeding" with respect to the reception of the "Q.931 Set up" message to the sending MG, and selects a codec scheme set by the receiving MG from the codec information list which is transmitted from the sending MG and then transmits the "Q.931 Alerting" message to the sending MG 1. Accordingly, in a state where a ring back tone is transmitted from the receiving MG to the sending MG through a Real-time Transport Protocol (RTP), when a hook off event occurs and a voice call connection is performed, the "Q.931 Connect" message is transmitted from the receiving MG to the sending MG so that a voice communication is performed through the RTP.

In a call setup process using an Session Initiation Protocol (SIP) of a VoIP system, a sending MG transmits a speech request message of "INVITE" to a receiving MG. That is, the sending MG transmits a list of several codec information to the receiving MG so as to negotiate with the receiving MG. Accordingly, the receiving MG transmits a confirmation message of "100 Trying" with respect to the reception of the "INVITE" message to the sending MG, and selects a codec scheme set by the receiving MG from the codec information list which is transmitted from the sending MG and then transmits the "180 Ringing" message to the sending MG. Accordingly, in the state where a ring back tone is transmitted from the receiving MG to the sending MG through an RTP, when a receiving terminal user hooks off to make a voice call connection, "200 OK" message is transmitted from the receiving MG to the sending MG and a confirmation message of "ACK" with respect to the transmission is transmitted to the receiving MG, so that a voice communication is performed through an RTP.

As such, in most current VoIP gateways, a determination of a codec scheme for the VoIP service is made at a time point of transmitting an alerting message (Q.931 alerting message in the case of H.323 and 180 response message in the case of SIP). The set codec scheme information remains unchanged even after the receiving terminal has been hooked off. Accordingly, since the same codec as that in the ring-back tone service is used even after the receiving terminal is hooked off, it is confronted by a trade-off problem between the above mentioned MOS value and the bandwidth. That is, in utilizing the G.711 scheme that is a codec of PCM scheme for the sake of qualitative provision of a coloring service, a drawback occurs in that the bandwidth is wasted compared with the G.723.1 and G.729 schemes. In the G.723.1 and G.729 schemes having excellent bandwidth performance, a drawback occurs in that the qualitative service for the coloring service cannot be provided due to the voice property based algorithm. When various QoS algorithms to guarantee the speech quality are used in a network where voice and data are simultaneously serviced, a drawback occurs in the data service due to the relative waste of bandwidth. Accordingly, when a tone generator service, such as the coloring and RING TO ME is used, which is not a simple ring-back tone but has recently been highlighted as an effective additional service in voice communication, it is difficult to provide the qualitative service similar to the PSTN even with the G.723.1 and G.729 schemes whose technical origin is based on voice properties.

SUMMARY OF THE INVENTION

It is, therefore, an object of the present invention to provide a system and method for changing codec information to provide a coloring service between VoIP terminals, capable of providing a more efficient coloring service by applying different compression schemes in a calling state and a call connecting state between VoIP terminals.

According to one aspect of the present invention, a system to change compression information to provide a coloring service in a communication terminal is provided, the system comprising: a gateway including: a compressor adapted to compress ring back tone data in a calling state and to compress voice signal data in a call connecting state between communication terminals, the data being compressed according to preset different compression information; and a transmitter adapted to transmit the compressed data to a receiving terminal.

The system preferably further comprises a user profile database adapted to store setup information of the coloring service and compression information in the calling state and the call connecting state.

The gateway compressor is preferably adapted to compress the ring back tone data in the calling state using a G.711 Pulse Code Modulation (PCM) scheme.

The ring back tone data preferably corresponds to at least one of a Ring To Me service and a Ring To You service.

The gateway compressor is preferably adapted to compress the voice signal data in the call connecting state using at least one of a G.723.1 scheme and a G.729 scheme.

According to another aspect of the present invention, a system to change compression information to provide a coloring service in a communication terminal is provided, the system comprising: a compression information setup unit adapted to differently set up compression information in a calling state and a call connecting state according to a call access request of a sending terminal; and a compressed information decompression unit adapted to decompress the compression information in the calling state and the call connecting state received from the compression information setup unit and to transmit the decompressed information to the receiving terminal.

The system preferably further comprises a user profile database adapted to store setup information of the coloring service and compression information in the calling state and the call connecting state.

The system compression information setup unit is preferably adapted to compress ring back tone data in the calling state using a G.711 PCM scheme.

The ring back tone data preferably corresponds to at least one of a Ring To Me service and a Ring To You service.

The compression information setup unit is preferably adapted to compress voice signal data in the call connecting state using at least one of a G.723.1 scheme and a G.729 scheme.

According to still another aspect of the present invention, a method of changing compression information to provide a coloring service in a communication terminal is provided, the method comprising: compressing a ring back tone signal in a calling state and compressing a voice signal in a call connecting state between communication terminals, the data being compressed according to preset different compression information; and transmitting both compressed signals to a receiving terminal.

The ring back tone signal in the calling state is preferably compressed using the G.711 PCM scheme.

The ring back tone signal preferably corresponds to at least one of a Ring To Me service and a Ring To You service.

The voice signal in the call connecting state is preferably compressed using at least one of a G.723.1 scheme and a G.729 scheme.

According to yet another aspect of the present invention, a method of changing compression information to provide a coloring service in a communication terminal is provided, the method comprising: setting up compression information in a calling state and a call connecting state differently from each other according to a call access request of a sending terminal; and decompressing the different compression information in the calling state and the call connecting state; and transmitting the decompressed information to a receiving terminal.

The ring back tone data in the calling state is preferably compressed using a G.711 PCM scheme.

The ring back tone data preferably corresponds to at least one of a Ring To Me service and a Ring To You service.

The voice signal data in the call connecting state is preferably compressed using at least one of a G.723.1 scheme and a G.729 scheme.

According to another aspect of the present invention, a method of changing compression information to provide a coloring service in a communication terminal is provided, the method comprising: transmitting a codec information list of a calling state and a codec information list of a call connecting state according to a call access request of a sending terminal; selecting, by a receiving terminal, codec information of the calling state and codec information of the call connecting state and transmitting the selected information to the sending terminal; setting up the codec information of the calling state and codec information of the call connecting state transmitted from the sending terminal to the receiving terminal; compressing a ring back tone using the codec information of the calling state and transmitting the compressed ring back tone;

and compressing a voice signal using the codec information of the call connecting state and transmitting the compressed voice signal upon a hook off event having occurred.

In compressing a ring back tone using the codec information of the calling state and transmitting the compressed ring back tone, the ring back tone of the calling state is preferably compressed using a G.711 PCM scheme.

In compressing a voice signal using the codec information of the call connecting state and transmitting the compressed voice signal, the voice signal of the call connecting state is preferably compressed using at least one of a G.723.1 scheme and a G.729 scheme.

According to still another aspect of the present invention, a method of changing compression information to provide a coloring service in a communication terminal is provided, the method comprising: generating a hold start signal during a voice communication and changing codec information of a call connecting state to codec information of a calling state; compressing a ring back tone using the codec information of the calling state and transmitting the compressed ring back tone; generating a hold-end signal upon the ring back tone being transmitted and changing the codec information of the calling state to the codec information of the call connecting state; and compressing the voice signal using the codec information of the call connecting state and transmitting the compressed voice signal.

In compressing a ring back tone using the codec information of the calling state and transmitting the compressed ring back tone, the ring back tone in the calling state is preferably compressed using a G.711 PCM scheme.

In compressing the voice signal using the codec information of the call connecting state and transmitting the compressed voice signal, the voice signal in the call connecting state is preferably compressed using at least one of a G.723.1 scheme and a G.729 scheme.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings, in which like reference symbols indicate the same or similar components, wherein.

DETAILED DESCRIPTION OF THE INVENTION

Figure 1:
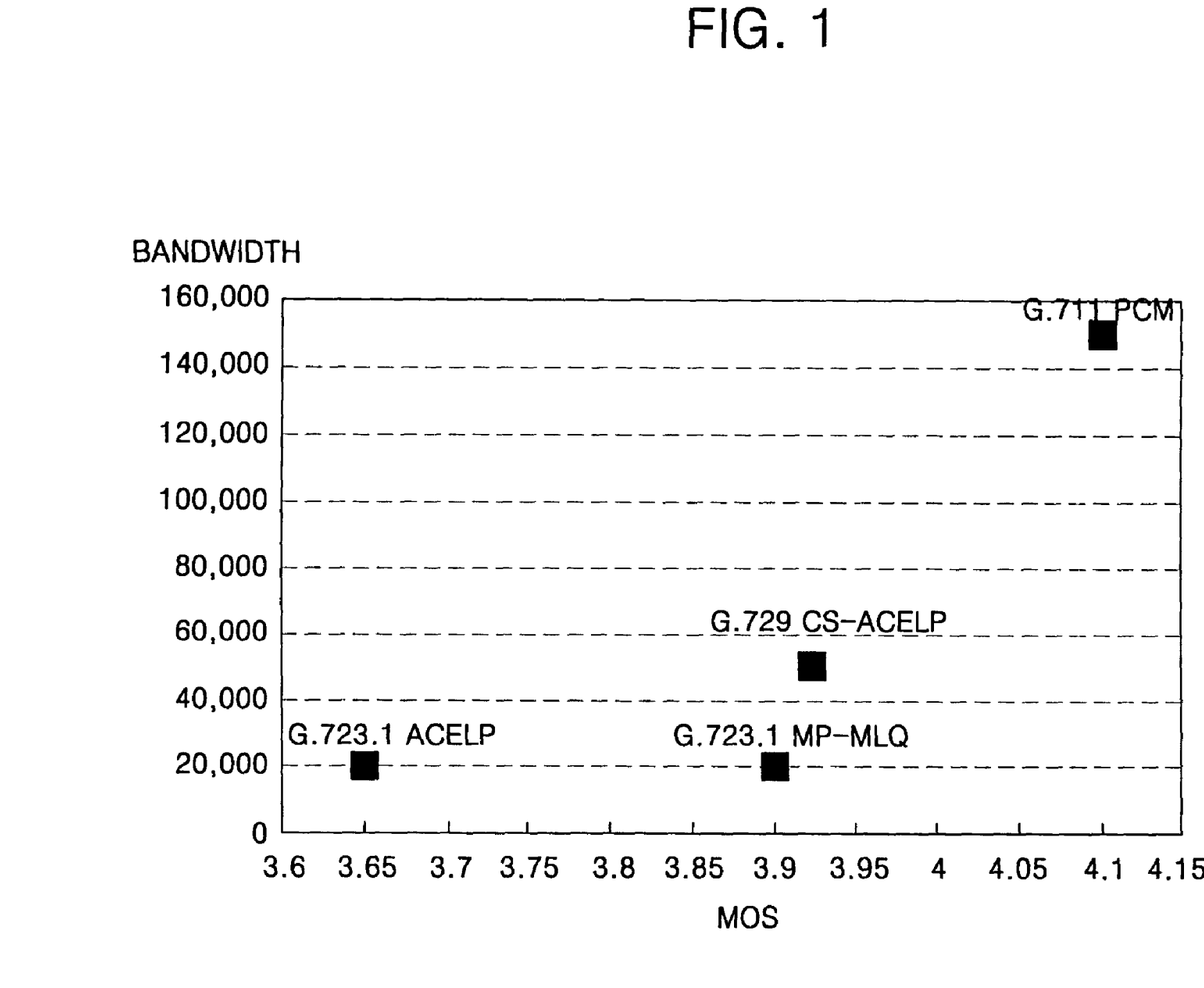
FIG. 1 is a diagram of a relationship between bandwidth of various kinds of codecs and Mean Option Scores (MOSs)

FIG. 1 is a diagram of a relationship between bandwidth of various kinds of codecs and Mean Option Scores (MOSs).

As shown in FIG. 1, since the G.711 PCM scheme wastes more bandwidth compared with other codec schemes, the MOS of Table 1 above should not be solely considered in a diagram of the bandwidth of a network. Particularly, although the G.723.1 MP-MLQ scheme and G.729 CS-ACELP scheme have MOS values of 3.9 and 3.92 that are lower than that of G.711 PCM scheme, it can be understood that they have better performance than that of the G.711 PCM scheme in MOS effect in contrast with the bandwidth since MOS deterioration is hard to perceive compared with the G.711 PCM scheme. Therefore, codec technology that is generally used in a current VoIP gateway mainly adopts the G.729 CS-ACELP scheme that has an excellent MOS value compared to the bandwidth as shown in FIG. 1.

However, as the communication network managed with the call charge as a main income source to provide the communication service, recently, tries to make a profit on the basis of various additional services, service provisions using a tone generator are increased. A representative service includes a coloring service such as a Coloring and a Ring To Me, which is provided before a speech path is established. This is a CS-ACELP scheme based on a narrowband voice conversion and voice property, which causes consumer dissatisfaction with the speech quality unlike the voice service, such that the user has a bad impression of VoIP service. In order to overcome this problem, VoIP service can be provided by utilizing the G.711 PCM scheme which has a high Mean Option Score (MOS). However, it cannot be a desirable solution in that it causes a problem in using network resources efficiently and can create a limited inconvenience for a data service due to performance of a bandwidth resource reservation function for guaranteeing the speech quality of VoIP.

Figure 2A:
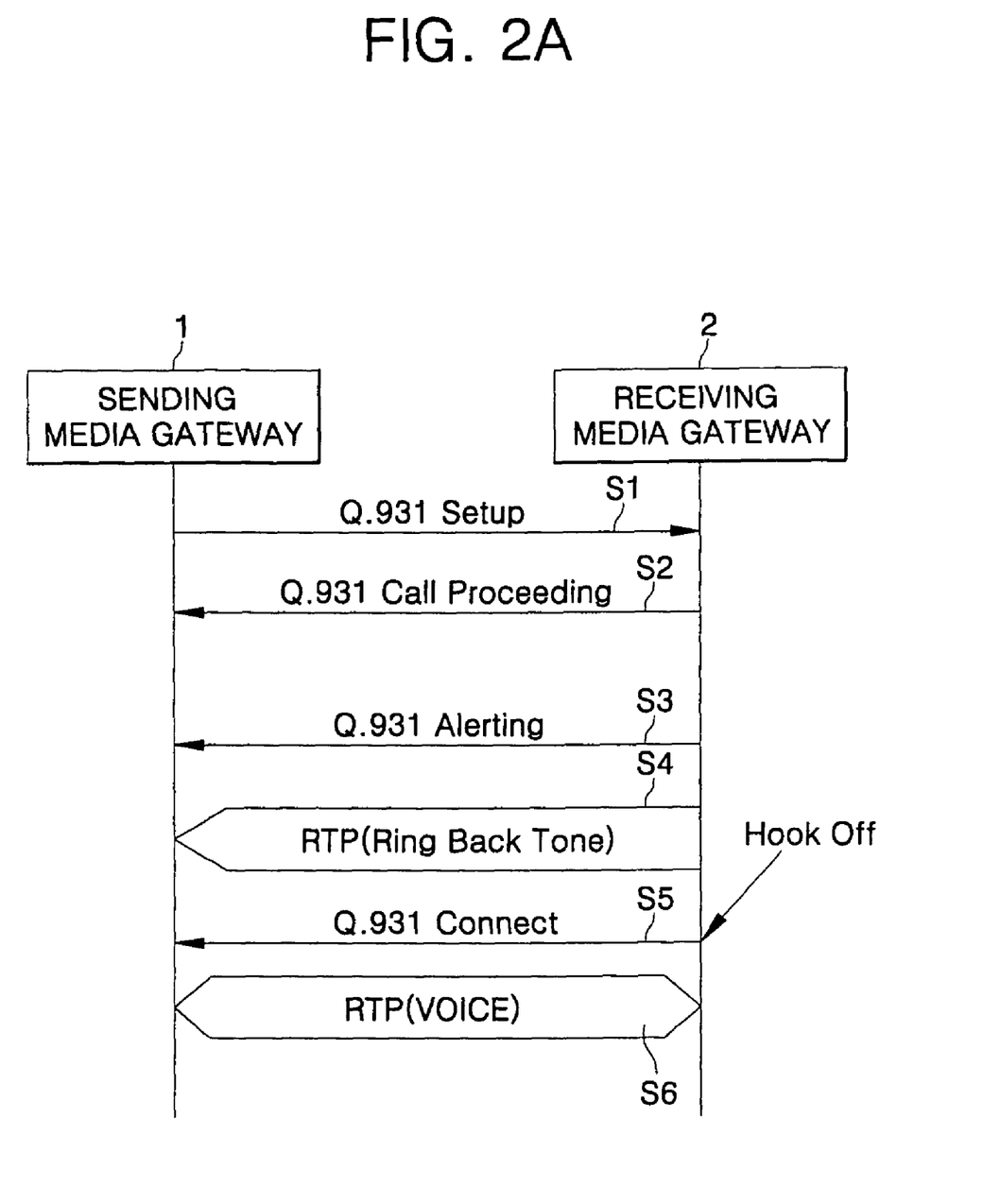
FIG. 2A is a view of a call setup process using H.323 protocol in a VoIP system.

FIG. 2A is a view of a call setup process using H.323 protocol in a VoIP system. In the process, a sending Media Gateway (MG) 1 transmits "Q.931 Set up" message to a receiving MG 2 (S1). That is, the sending MG 1 transmits a list of several codec information to the receiving MG 2 so as to negotiate with the receiving MG 2. Accordingly, the receiving MG 2 transmits a confirmation message of "Q.931 Call Proceeding" with respect to the reception of the "Q.931 Set up" message to the sending MG 1 (S2), and selects a codec scheme set by the receiving MG 2 from the codec information list which is transmitted from the sending MG 1 and then transmits the "Q.931 Alerting" message to the sending MG 1 (S3). Accordingly, when a ring back tone is transmitted from the receiving MG 2 to the sending MG 1 through a Real-time Transport Protocol (RTP) (S4), when a hook off event occurs and a voice call connection is performed (S5), the "Q.931 Connect" message is transmitted from the receiving MG 2 to the sending MG 1 so that a voice communication is performed through the RTP (S6).

Figure 2B:
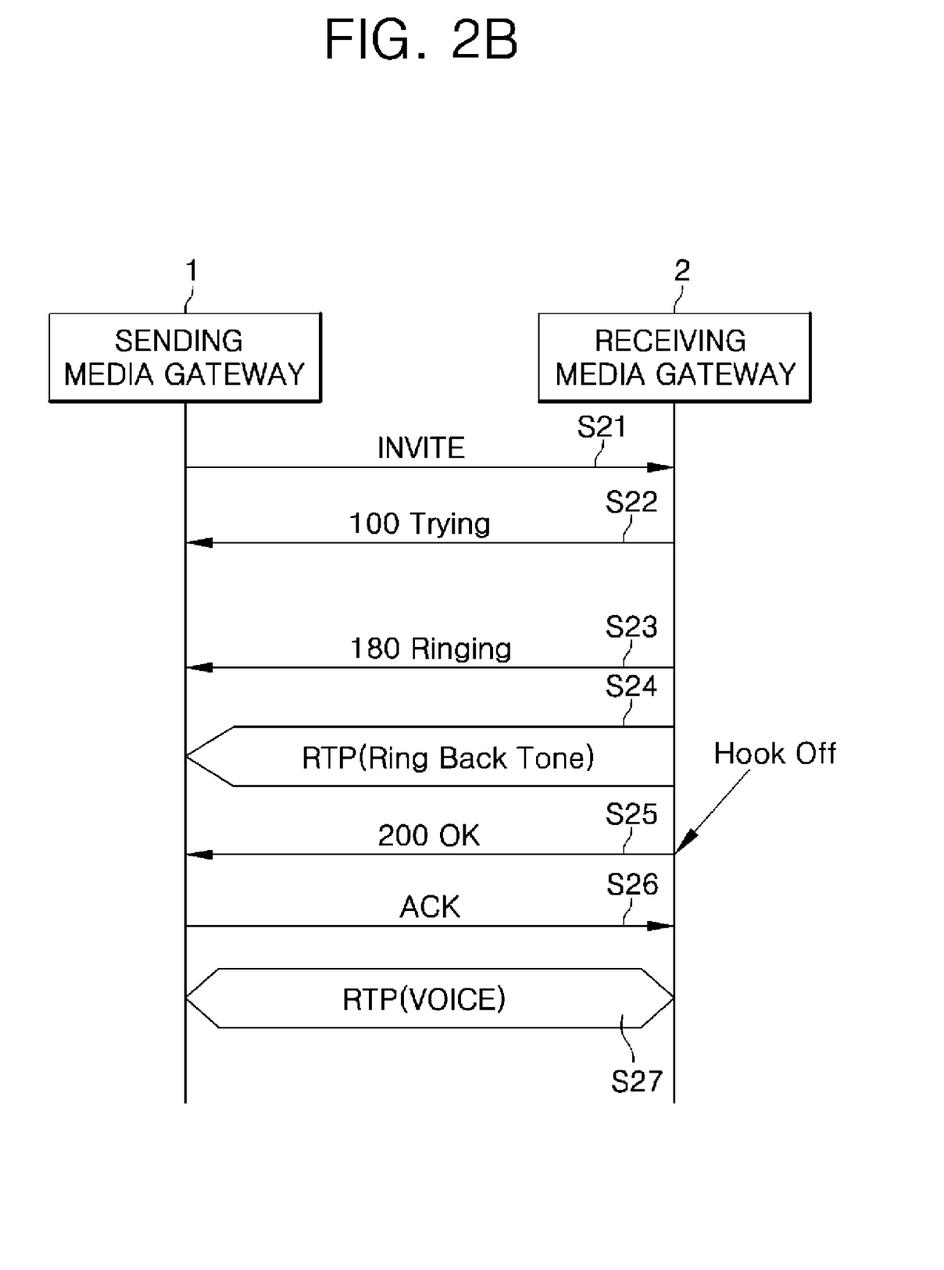
FIG. 2B is a view of a call setup process using an SIP protocol in a VoIP system.

FIG. 2B is a view of a call setup process using an SIP protocol in a VoIP system. In this process, a sending MG 1 transmits a speech request message of "INVITE" to a receiving MG 2 (S21). That is, the sending MG 1 transmits a list of several codec information to the receiving MG 2 so as to negotiate with the receiving MG 2. Accordingly, the receiving MG 2 transmits a confirmation message of "100 Trying" with respect to the reception of the "INVITE" message to the sending MG 1 (S22), and selects a codec scheme set by the receiving MG 2 from the codec information list which is transmitted from the sending MG 1 and then transmits the "180 Ringing" message to the sending MG 1 (S23). Accordingly, when a ring back tone is transmitted from the receiving MG 2 to the sending MG 1 through an RTP (S24), when a receiving terminal user hooks off to make a voice call connection (S25), "200 OK" message is transmitted from the receiving MG 2 to the sending MG 1 and a confirmation message of "ACK" with respect to the transmission is transmitted to the receiving MG 2 (S26), so that a voice communication is performed through an RTP (S27).

The present invention will now be described more fully hereinafter with reference to the accompanying drawings, in which exemplary embodiments of the present invention are shown. The present invention can, however, be embodied in different forms and should not be construed as being limited to the embodiments set forth herein. Rather, these embodiments are provided so that this disclosure will be thorough and complete, and will fully convey the scope of the present invention to those skilled in the art. Like numbers refer to like elements throughout the specification.

Figure 3:
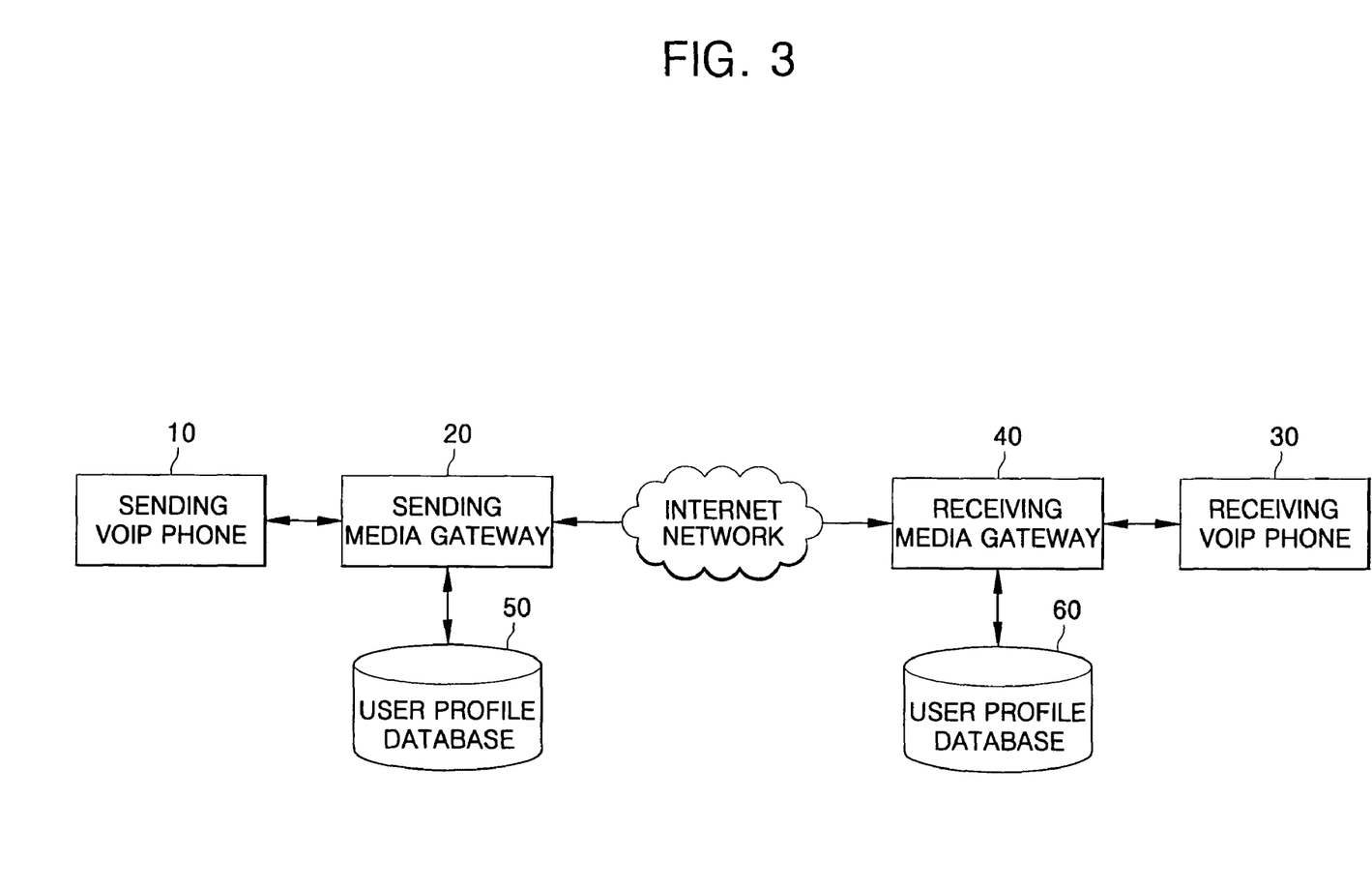
FIG. 3 is a block diagram of a system for changing codec information to provide a coloring service in a VoIP terminal in accordance with an embodiment of the present invention.

FIG. 3 is a block diagram of a system for changing codec information to provide a coloring service in a VoIP terminal in accordance with an embodiment of the present invention.

As shown in FIG. 3, a VoIP phone 10 and a sending MG 20 at the sending side, and a VoIP phone 30 and a receiving MG 40 at the receiving side are connected over the Internet network, and the sending MG 20 and receiving MG 40 respectively include user profile databases 50 and 60 having user profile information stored thereon. In particular, the user profile databases 50 and 60 at the sending and receiving sides store information as to whether or not a coloring service, that is, an additional service of the VoIP phone, such as a Ring to Me and a Ring to You, is used, a codec information list in the calling state, and a codec information list in the call connecting state.

The sending MG 20 first performs a call setup when a call access request of the VoIP phone 10 occurs. That is, the sending MG 20 checks whether or not the sender requested the coloring service in addition to the voice service in the calling state. If it has been confirmed that the coloring service has been requested, designated coloring service information is stored in the user profile database 50.

The sending MG 20 then transmits the codec information list in the calling state and the codec information list in the call connecting state between the sending and receiving VoIP terminals, stored in the user profile database 50, to the receiving MG 40 over the Internet network.

Accordingly, the receiving MG 40 selects the codec schemes that are set up by the gateway 40 from the codec information list in the calling state and the codec information list in the call connecting state that are transmitted by the sending MG 20, and transmits the selected schemes to the sending MG 20. It is desirable that the codec information in each of the set states is such that the G.711 scheme as a codec of a PCM scheme for the sake of qualitative provision of the coloring service is applied in the calling state, and the G.723.1 and G.729 embodied by an algorithm which is based on the voice property are applied in the call connecting state, for example.

Therefore, the sending MG 20 receives the codec information in the calling state and the codec information in the call connecting state that are selected from the receiving MG 40 and sets up codec information in each of the states.

As such, as the negotiation on the codec information in the calling state and the codec information in the call connecting state between the sending MG 20 and the receiving MG 40 is ended, the ring back tone transmitted from the receiving MG 40 to the sending MG 20 is compressed and transmitted in the G.711 scheme as a codec of the PCM scheme.

If a hook off signal is generated and transmitted from the receiving MG 40 to the sending MG 20 in such a ring back tone state, the sending MG 20 changes the G.711 codec scheme applied in the ring back tone state to the G.729 scheme. Accordingly, the voice signal transferred between the sender and receiver terminals in the call connecting state is compressed and transmitted in the G.723.1 and G.729 schemes.

Although the present invention has been described in which the ring back tone is compressed and transmitted in the G.711 codec scheme and the voice signal is compressed and transmitted in the G.723.1 and G.729 schemes, it is evident that such compression schemes are only illustrative and can be changed according to circumstances.

Figure 4A:
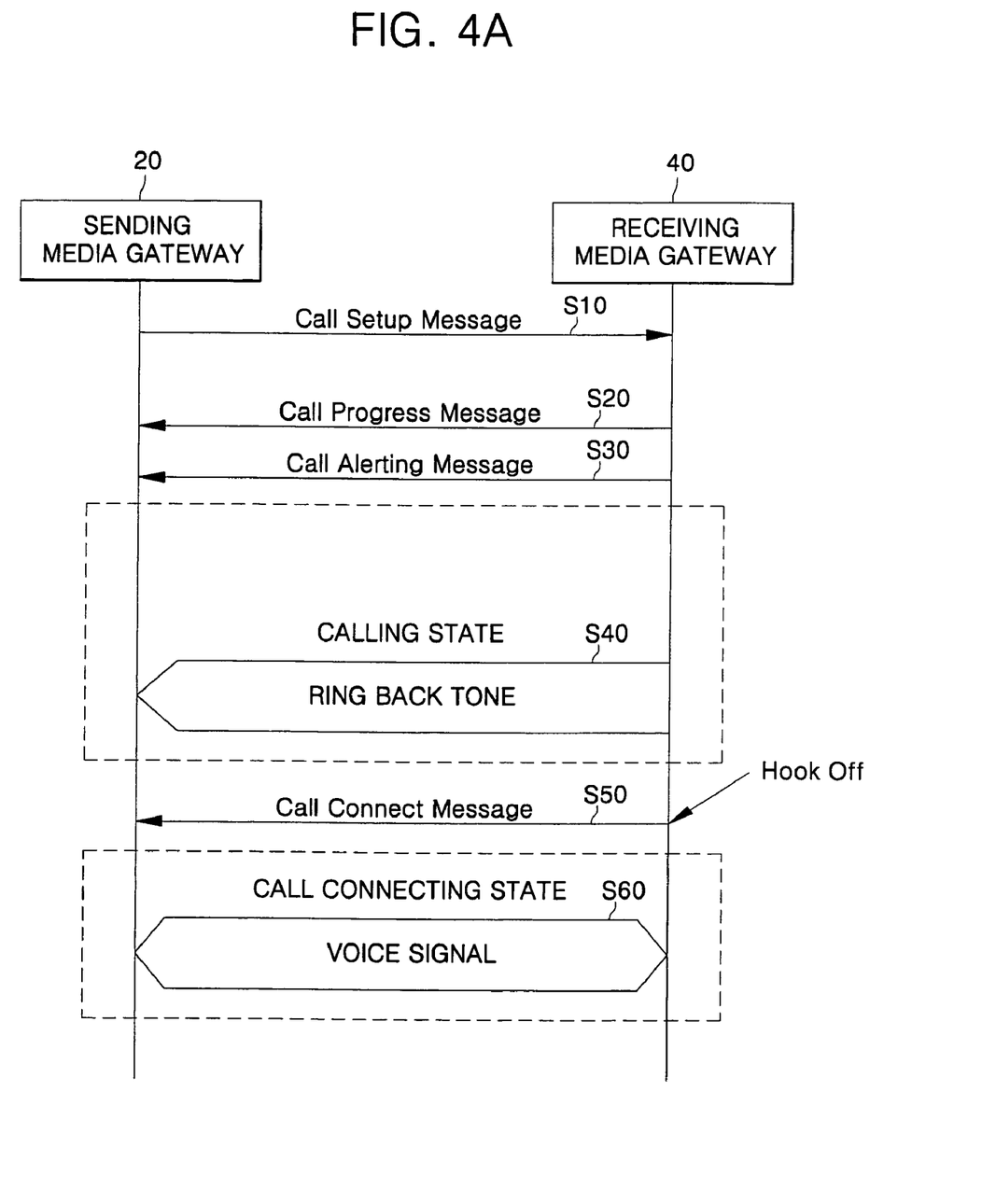
FIG. 4A is a view of a method of changing codec information using the H.323 protocol in a VoIP terminal in accordance with an embodiment of the present invention.

FIG. 4A is a view of a method of changing codec information using the H.323 protocol in a VoIP terminal in accordance with an embodiment of the present invention.

As shown in FIG. 4A, if a call access request of the sending VoIP phone 10 occurs, the sending MG 20 first checks whether or not the sender has requested the coloring service as a additional service in addition to the voice service in the calling state. If it is confirmed that the coloring service was requested, the requested coloring service information is stored in the user profile database 50. However, if it is confirmed that the coloring service was not requested, the codec scheme embodied with the voice property based algorithm through a general call setup process is set as described above, such that the qualitative service for the coloring service is not provided.

That is, the sending MG 20 transmits "Call Set up Message" to the receiving MG 40 in response to the call access request of the sending VoIP phone 10 (S10). This "Call Set up" message includes the codec information list in the calling state and the codec information list in the call connecting state.

Accordingly, the receiving MG 40 transmits a "Call Progress Message" indicating the reception of the "Call Set up Message" to the sending MG 20 (S20).

Subsequently, the receiving MG 40 selects codec schemes that were set by the gateway 40 from the codec information list in the calling state and the codec information list in the call connecting state that were transmitted from the sending MG 20, and transmits "Call Alerting Message" to the sending MG 20 (S30). It is desirable that the codec scheme selected by the receiving MG 40 selects the G.711 scheme being a codec of PCM scheme in the calling state for the sake of qualitative provision of the coloring service, and the G.723.1 and G.729 schemes embodied by the voice property based algorithm in the call connecting state, for example.

Accordingly, the sending MG 20 receives "Call Alerting Message" from the receiving MG 40, and sets up the codec information in the calling state and codec information in the call connecting state.

Subsequently, a negotiation on the codec information in the calling state and the call connecting state between the sending MG 20 and the receiving MG 40 is ended and a ring back tone is transmitted from the receiving MG 40 to the sending MG 20 (S40). The ring back tone transmitted to the sending MG 20 is compressed and transmitted in the G.711 scheme being a codec of the PCM scheme. Accordingly, the sender can be provided with a coloring service having good voice quality in the calling state.

Then, if "Call Connect Message" being a hook off signal is transmitted from the receiving MG 40 to the sending MG 20 while the speech connection voice is provided (S50), the sending MG 20 converts the G.711 codec scheme applied in the ring back tone into the G.723.1 and G.729 schemes embodied with the voice property based algorithm.

Accordingly, the voice signal between the sending and receiving terminals is compressed and transmitted in the G.723.1 and G.729 schemes in the call connecting state being a communication state as discussed above, so that the voice communication can be performed using the bandwidth efficiently (S60).

Figure 4B:
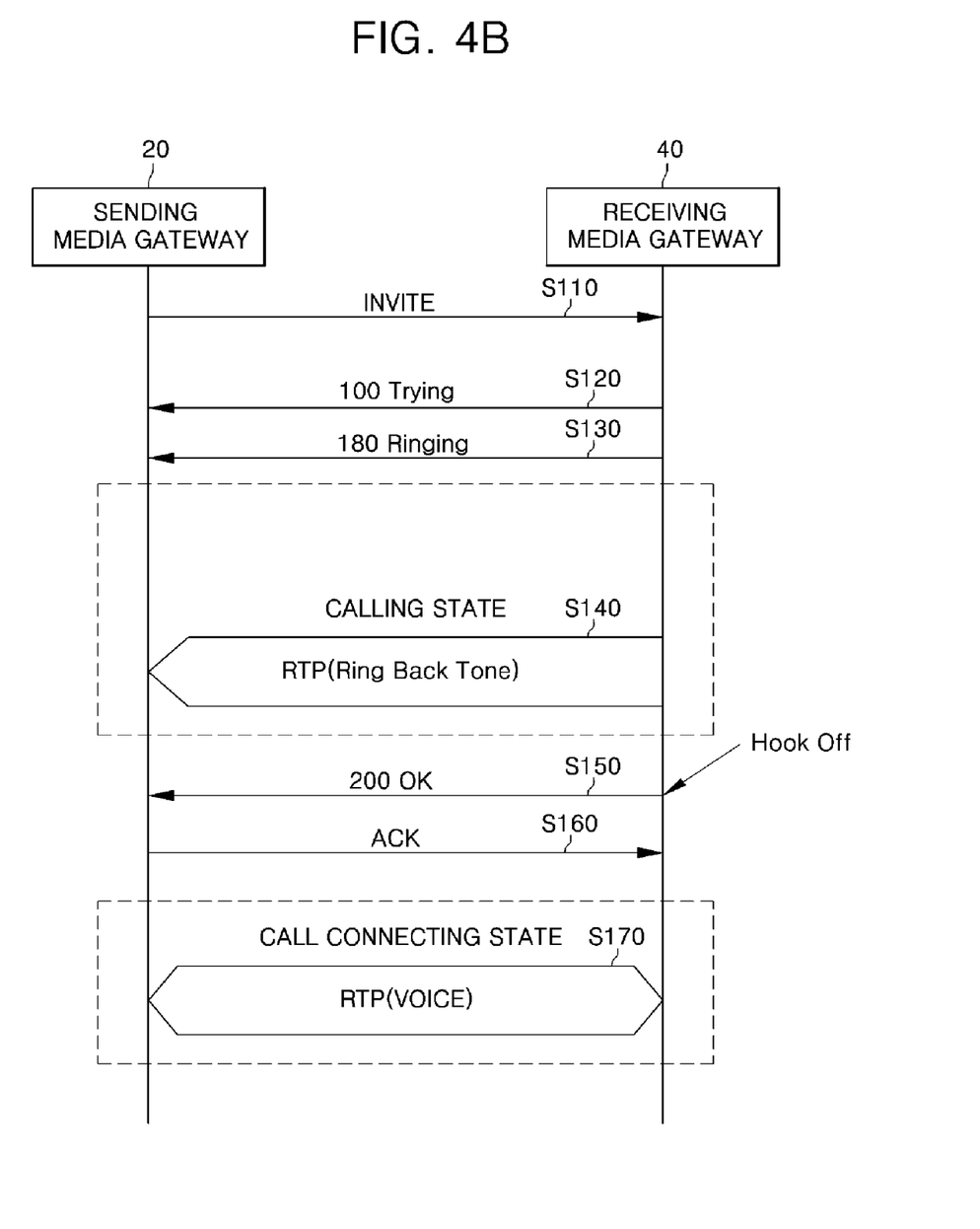
FIG. 4B is a view of a method of changing codec information using the SIP protocol in a VoIP terminal in accordance with an embodiment of the present invention.

FIG. 4B is a view of a method of changing codec information using the SIP protocol in a VoIP terminal in accordance with an embodiment of the present invention.

As shown in the FIG. 4B, the sending MG 20 transmits "INVITE" being a speech request message to the receiving MG 40 according to call connecting request of the sending VoIP phone 10 (S110). Such an "INVITE" message includes information on a codec information list in the calling state and a codec information list in the call connecting state.

Accordingly, the receiving MG 40 transmits "100 Trying" to the sending MG 20 in response to the "INVITE" (S120).

Subsequently, the receiving MG 40 selects codec schemes that are set by the receiving MG 40 from the codec information list in the calling state and the codec information list in the call connecting state that are transmitted from the sending MG 20, and transmits "180 Ringing" to the sending MG 20 (S130). It is desirable that the receiving MG 40 selects the G.711 scheme being a codec of the PCM scheme in the calling state in order to provide the qualitative provision of the coloring service, and the G.723.1 and G.729 schemes embodied with the voice property based algorithm in the call connecting state.

Accordingly, the sending MG 20 receives "180 Ringing" from the receiving MG 40, and sets up codec information in the calling state and call connecting state.

Subsequently, a negotiation on the codec information in the calling state and the call connecting state between the sending MG 20 and the receiving MG 40 is ended and a ring back tone is transmitted from the receiving MG 40 to the sending MG 20 (S140). The ring back tone transmitted to the sending MG 20 is compressed and transmitted in the G.711 scheme being a codec of the PCM scheme. Accordingly, the sender can be provided with a coloring service having good voice quality in the calling state.

Then, if "200 OK" as a hook off signal is transmitted from the receiving MG 40 to the sending MG 20 while the speech connection voice is being provided (S150), the sending MG 20 transmits a response message of "ACK" to the receiving MG 40 (S160).

The sending MG 20 then converts the G.711 codec scheme applied in the speech connection voice state into the G.723.1 and G.729 schemes embodied with the voice property based algorithm.

Accordingly, the voice signal transmitted between the sending and receiving terminals is compressed and transmitted in the G.723.1 and G.729 schemes in the call connecting state being a speech state, so that the voice communication can be performed using the bandwidth efficiently (S170).

Figure 5:
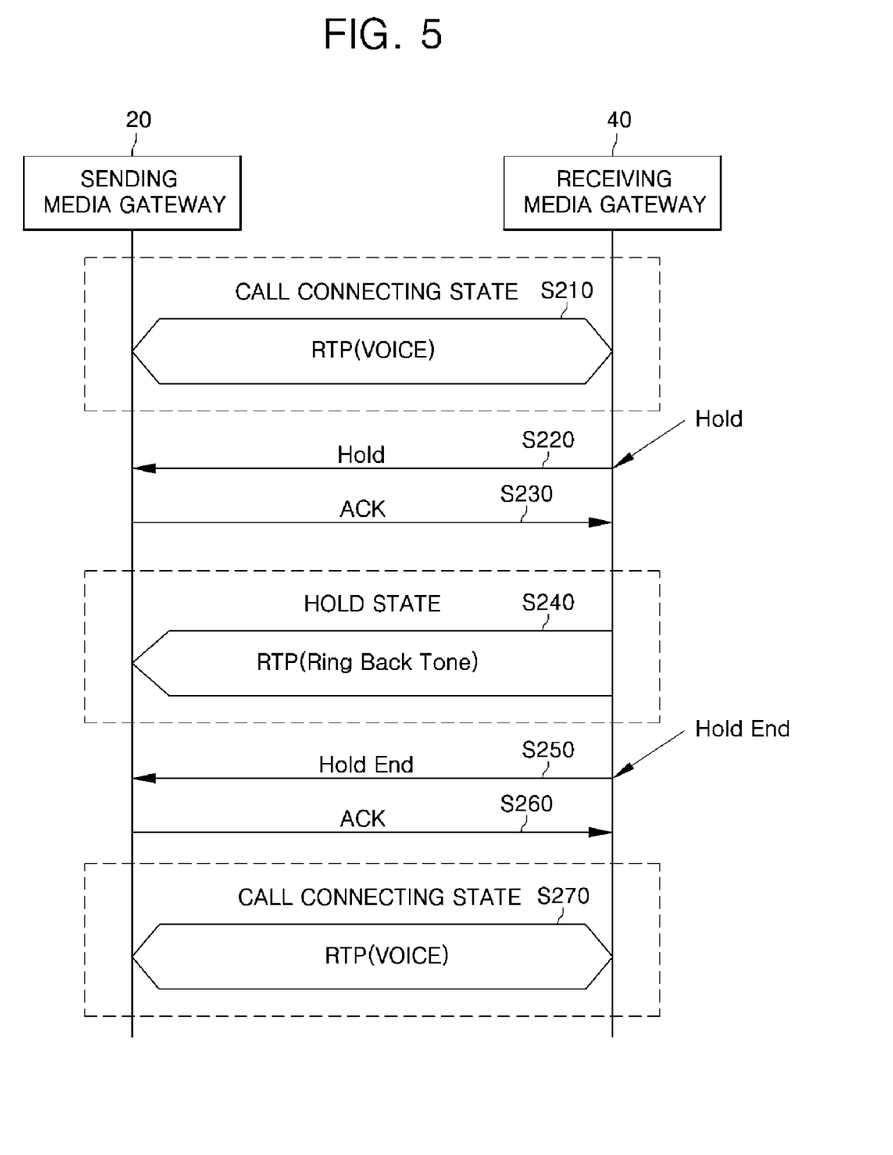
FIG. 5 is a view of a method of changing codec information upon speech holding using the SIP protocol in a VoIP terminal in accordance with an embodiment of the present invention.

FIG. 5 is a view of a method of changing codec information upon speech holding using the SIP protocol in a VoIP terminal in accordance with an embodiment of the present invention.

As shown in FIG. 5, when a call is connected between the sending MG 20 and the receiving MG 40 and a speech communication proceeds (S210), if a hold start signal is transmitted from the receiving MG 40 to the sending MG 20 (S220), the sending MG 20 transmits "ACK" message to the receiving MG 40 in response to the hold start signal (S230).

Accordingly, the ring back tone is transmitted from the receiving MG 40 to the sending MG 20 (S240). The ring back tone transmitted to the sending MG 20 is compressed and transmitted in the G.711 scheme being a codec of PCM scheme on which a negotiation was performed between the sending MG 20 and the receiving MG 40. Therefore, the sender can be provided with a coloring service having good voice quality in the calling state.

Then, if the hold end signal is transmitted from the receiving MG 40 to the sending MG 20 (S250), the sending MG 20 transmits "ACK" message to the receiving MG 40 in response to the hold end signal (S260).

Then, the sending MG 20 changes the G.711 codec scheme applied in the ring back tone state to the G.723.1 and G.729 schemes embodied with the voice property algorithm.

Accordingly, the voice signal between the sending and receiving terminals is compressed and transmitted in the G.723.1 and G.729 schemes in the connection state as above, so that the voice communication can be performed using the bandwidth efficiently (S270).

Although the present invention has been described with reference to the exemplary embodiments thereof, it will be understood by those skilled in the art that various changes in form and details can be made to the invention without departing from the scope of the present invention as defined by the following claims.

According to the present invention, it is possible to more efficiently provide services for coloring and voice with the minimum bandwidth by applying different compression schemes in calling state where the ring back tone between VoIP terminals is provided and in the call connecting state where the speech path is established.

What is claimed is:

1. A system to change compression information to provide a coloring service in a communication terminal, the system comprising:
   a gateway comprising:
      a compressor to compress ring back tone data in a calling state and to compress voice signal data in a call connecting state between communication terminals, the ring back tone data being compressed according to a first compression information and the voice signal data being compressed according to a second compression information; and
      a transmitter to transmit the compressed ring back tone data and the compressed voice signal data to a receiving terminal,
   wherein the first compression information differs from the second compression information, and
   wherein the gateway is configured to determine whether coloring service is requested, and, in response to the coloring service being requested, the first compression information comprises provisions for coloring service information corresponding to the requested coloring service in the calling state.

2. The system according to claim 1, further comprising a user profile database to store the coloring service information, the first compression information, and the second compression information.

3. The system according to claim 1, wherein the compressor compresses the ring back tone data in the calling state using a G.711 Pulse Code Modulation (PCM) scheme.

4. The system according to claim 3, wherein the ring back tone data corresponds to at least one of a Ring To Me service and a Ring To You service.

5. The system according to claim 1, wherein the compressor compresses the voice signal data in the call connecting state using at least one of a G.723.1 scheme and a G.729 scheme.

6. A system to change compression information to provide a coloring service in a communication terminal, the system comprising:
- a compression information setup unit to set up a first compression information in a calling state and a second compression information in a call connecting state according to a call access request of a sending terminal; and
- a compressed information decompression unit to decompress the first compression information in the calling state and the second compression information in the call connecting state received from the compression information setup unit and to transmit the decompressed information to the receiving terminal,
- wherein the first compression information differs from the second compression information, and
- wherein, in response to a coloring service being requested by the sending terminal, the first compression information comprises provisions for coloring service information corresponding to the requested coloring service in the calling state.

7. The system according to claim 6, further comprising a user profile database to store the coloring service information, the first compression information, and the second compression information.

8. The system according to claim 6, wherein the compression information setup unit compresses ring back tone data in the calling state using a G.711 PCM scheme.

9. The system according to claim 8, wherein the ring back tone data corresponds to at least one of a Ring To Me service and a Ring To You service.

10. The system according to claim 6, wherein the compression information setup unit compresses voice signal data in the call connecting state using at least one of a G.723.1 scheme and a G.729 scheme.

11. A method of changing compression information to provide a coloring service in a communication terminal, the method comprising:
- determining if a sending terminal requested a coloring service;
- compressing a ring back tone signal in a calling state and compressing a voice signal in a call connecting state between the sending terminal and a receiving terminal, the ring back tone signal being compressed according to a first compression information and the voice signal being compressed according to a second compression information; and
- transmitting the compressed ring back tone signal and the compressed voice signal to the receiving terminal,
- wherein the first compression information differs from the second compression information, and
- wherein, in response to the coloring service being requested, the first compression information comprises provisions for coloring service information corresponding to the requested coloring service in the calling state.

12. The method according to claim 11, wherein the ring back tone signal in the calling state is compressed using the G.711 PCM scheme.

13. The method according to claim 12, wherein the ring back tone signal corresponds to at least one of a Ring To Me service and a Ring To You service.

14. The method according to claim 11, wherein the voice signal in the call connecting state is compressed using at least one of a G.723.1 scheme and a G.729 scheme.

15. A method of changing compression information to provide a coloring service in a communication terminal, the method comprising:
- determining if a sending terminal requested a coloring service;
- setting up first compression information in a calling state and second compression information in a call connecting state according to a call access request of a sending terminal, the first compression information comprising provisions for coloring service information corresponding to the requested coloring service in the calling state in response to the coloring service being requested;
- decompressing the first compression information in the calling state and the second compression information in the call connecting state; and
- transmitting the decompressed first compression information and the second compression to a receiving terminal,
- wherein the first compression information differs from the second compression information.

16. The method according to claim 15, wherein ring back tone data in the calling state is compressed using a G.711 PCM scheme.

17. The method according to claim 16, wherein the ring back tone data corresponds to at least one of a Ring To Me service and a Ring To You service.

18. The method according to claim 15, wherein voice signal data in the call connecting state is compressed using at least one of a G.723.1 scheme and a G.729 scheme.

* * * * *